United States Patent [19]
Renkema et al.

[11] Patent Number: 6,150,483
[45] Date of Patent: *Nov. 21, 2000

[54] CATALYST SYSTEM FOR THE PREPARATION OF A RUBBERY COPOLYMER

[75] Inventors: Jacob Renkema, Born; Peter J. H. Windmuller, Landgraaf, both of Netherlands

[73] Assignee: DSM N.V., Heerlen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 09/025,339

[22] Filed: Feb. 18, 1998

Related U.S. Application Data

[63] Continuation of application No. PCT/NL96/00319, Aug. 9, 1996.

[30] Foreign Application Priority Data

Aug. 21, 1995 [NL] Netherlands ............................ 1001014

[51] Int. Cl.$^7$ ....................................................... C08F 4/52
[52] U.S. Cl. ......................... 526/163; 526/165; 526/169.2
[58] Field of Search ..................................... 526/163, 165, 526/169.2

[56] References Cited

U.S. PATENT DOCUMENTS

| | | |
|---|---|---|
| 3,113,115 | 12/1963 | Ziegler et al. . |
| 3,678,018 | 7/1972 | Yasui et al. . |
| 3,723,348 | 3/1973 | Apotheker et al. ................. 252/429 B |
| 4,472,315 | 9/1984 | Albizzati et al. ................... 260/429 R |
| 4,771,115 | 9/1988 | Albizzati et al. ........................ 526/163 |
| 5,120,696 | 6/1992 | Tsutsui et al. . |
| 5,139,985 | 8/1992 | Barbe' et al. ............................ 502/109 |
| 5,266,544 | 11/1993 | Tsutsui et al. . |

FOREIGN PATENT DOCUMENTS

| | | |
|---|---|---|
| 0 021 753 A1 | 1/1981 | European Pat. Off. . |
| 0 044 119 A2 | 1/1982 | European Pat. Off. . |
| 0 439 964 A2 | 8/1991 | European Pat. Off. . |
| 0 633 272 A1 | 1/1995 | European Pat. Off. . |
| 633272 | 1/1995 | European Pat. Off. . |
| 0 653 443 A1 | 5/1995 | European Pat. Off. . |
| 1 294 416 | 10/1962 | France . |
| 1 327 965 | 9/1963 | France . |
| 1 296 796 | 6/1969 | Germany . |
| 96/15161 | 5/1996 | WIPO . |

*Primary Examiner*—David W. Wu
*Assistant Examiner*—R. Rabago
*Attorney, Agent, or Firm*—Pillsbury Madison & Sutro LLP

[57] ABSTRACT

The invention relates to a catalyst system and a process suited for the preparation of a rubbery copolymer of ethylene, one or more α-olefins and optionally one or more polyunsaturated compounds, in which the catalyst system comprises a vanadium compound, an organometal compound and optionally a promoter, characterized in that the organometal complex in the catalyst system is an imido complex that satisfies the general formula $$(R_u\text{-}X^1_v\text{-}Me^1)_n=NR^1 \qquad (I)$$

where each individual $Me^1$ is a metal chosen from group 1, 2, 12 or 13 of the Periodic System of Elements, each individual R is hydrogen or a hydrocarbon group having 1–20 C atoms, N—$R^1$ is an imido group where $R^1$ is hydrogen or a hydrocarbon group having 1–20 C atoms or a group with the general formula $MR^3_3$, where M is an element chosen from group 14 of the Periodic System of Elements, each individual $R^3$ is hydrogen, a hydrocarbon group having 1–20 C atoms or a heteroatom-containing group, $X^1$ is a halogen atom and $n \geq 1$; $u > 0$, $v \geq 0$; $u+v+2/n=p$, where p=valency of $Me^1$.

4 Claims, No Drawings

CATALYST SYSTEM FOR THE PREPARATION OF A RUBBERY COPOLYMER

This is a Continuation of International Appln. No. PCT/NL96/00319, filed Aug. 9, 1996, which designated the U.S.

The invention relates to a catalyst system suited for the preparation of a rubbery copolymer of ethylene, one or more α-olefins and optionally one or more polyunsaturated compounds, comprising a vanadium compound, an organometal compound and optionally a promoter.

A similar catalyst system is disclosed in EP-A-44,119. Such a catalyst system enables amorphous ethylene/α-olefin copolymers (also known as EAM rubbers) as well as amorphous ethylene/α-olefin/diene terpolymers (also known as EADM rubbers) to be obtained. Propylene is often used as α-olefin in the preparation of EPM or EPDM rubbers. However, the rubbers that are obtained in this manner have a narrow molecular weight distribution (MWD) and a narrow composition distribution. The latter means that the molecule chains almost all have the same structure. A narrow MWD here and hereafter means a MWD of less than 5. It is not well possible to produce rubbers having a wide or a very wide MWD with the aid of such a catalyst. Both a narrow MWD and a narrow composition distribution are in themselves important if in a later vulcanization reaction a high degree of vulcanization of the rubbers is to be achieved. A high degree of vulcanization in its turn is important for good properties of the vulcanized end product. However, rubbers having a narrow MWD and a narrow composition distribution also have a number of drawbacks. Their flow behaviour is poor so that the rubbers cannot be extruded or can be extruded only with great difficulty. Another drawback is poor miscibility of these rubbers in further processing; refer to Noordermeer and Wilms, Kautschuk, Gummi & Kunststoffe, vol. 41(6), 1988, pp 558–563.

The object of the invention is to provide a catalyst system enabling rubbers having a controllable wide or very wide MWD to be produced.

This object is achieved by the organometal compound in the catalyst system being an imido complex that satisfies the general formula

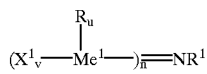

(I)

where each individual $Me^1$ is a metal chosen from group 1, 2, 12 or 13 of the Periodic System of Elements, each individual R is hydrogen or a hydrocarbon group having 1–20 C atoms, $NR^1$ is an imido group where $R^1$ is hydrogen or a hydrocarbon group having 1–20 C atoms or a group with the general formula $MR^3{}_3$, where M is an element chosen from group 14 of the Periodic System of Elements, each individual $R^3$ is hydrogen, a hydrocarbon group having 1–20 C atoms or a heteroatom-containing group, $X^1$ is a halogen atom and $n \geq 1$; $u>0$, $v \geq 0$; $u+v+2/n=p$, where $p$=valency of $Me^1$.

Accordingly, one or two metal ligands may be bonded to the imido complex according to formula (I); if n=1, the imido complex is represented by the formula:

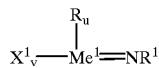

(II)

and it holds that u+v=p−2; if n=2, the imido complex is represented by the formula:

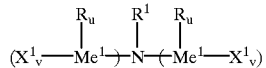

(III)

and it holds that: u+v=p−1. The

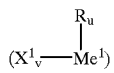

groups in this complex III may be the same or different.

The organometal compound (also known as cocatalyst) may be present in monomeric or in oligomeric form.

Due to the presence of the organometal compound (I) in the catalyst system it is possible to obtain rubbers having a wide or very wide MWD. As a result, the rubbers exhibit excellent extrusion and mixing behaviour. Here and hereafter reference is invariably made to a molecular weight distribution, because the molecular weight distribution can be determined more easily and clearly than the composition distribution. In effect, the distribution in general, i.e. both the composition distribution and the molecular weight distribution, may be said to become wider.

By hydrocarbon group in the respective groups in formula (I) is meant an alkyl, aryl, acyl, cycloalkyl, cycloaryl or cycloacyl group. Use may also be made of hydrocarbon groups having one or more functional groups, like e.g. halogen atoms, —OH, —OR, —COOH, —COOR or —NH$_2$ groups.

$Me^1$ preferably is aluminium. Preferably v is $\geq 1$; in that case $X^1$ preferably is chlorine.

In the $M^3{}_3$ group, M preferably is Si. Each individual $R^3$ may be a hydrocarbon group having 1–20 C atoms or a heteroatom-containing group with the heteroatom being chosen from group 15, 16 or 17 of the Periodic System of Elements, more particularly from the group of N, O, P and S or halogen. Each separate $R^3$ may or example also be an alkoxy, aryloxy, amine or amide group, an S compound such as sulphide, sulphite, sulphate, thiol, sulphinate, a P compound such as phosphine, phosphite or phosphate.

If aluminium is chosen for $Me^1$, compound (I) (an aluminium imido complex) can be prepared starting from for example an organoaluminium compound and a primary amine. A process for preparing such an aluminium imido complex is described in M. Cohen, J. K. Gilbert, J. D. Smith, J. Chem. Soc., 1965, 1092 and in J. K. Gilbert, J. D. Smith, J. Chem. Com. (A), 1968, 233.

The temperature at which such preparation takes place usually is in the range from 115 to 250° C. A temperature suitable for the formation of the imido complex can readily be determined by one skilled in the art through simple experiment.

The aluminium imido complexes, if still devoid of halide, may be reacted with an organo- aluminium halide to form halogen-containing aluminium imido complexes.

The following reactions may be mentioned here for illustration: starting from complex (II):

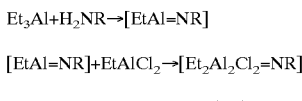

and starting from complex (III):

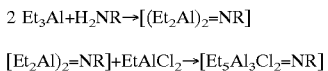

In the above reaction equations, "Et" represents an ethyl group; it will be clear that (mixtures of) other alkyl groups and (mixtures of) other organoaluminium halides are suitable also; other organometal(halide) compounds are also applicable here.

An extra organometal having the following general formula

may be present in the catalyst system, where $Me^2$ is chosen from group 1, 2, 12 or 13 of the Periodic System of Elements, each $R^4$ may be the same or different and represents hydrogen or a hydrocarbon group having 1–20 C atoms, $X^2$ is a halogen atom, $x \leq p$, and p=valency of $Me^2$.

This affords an extra possibility of controlling the MWD. Consequently, the rubbers to be prepared therewith can in effect be tailor-made.

Preferably, aluminium is also chosen for $Me^2$. $X^2$ preferably is chlorine. In particular, in (IV) $x \geq 1$. The most suitable compounds for compound (IV) are ethylaluminiumdichloride (MEAC), sesquiethylaluminium-chloride (SEAC) or diethylaluminiumchloride (DEAC).

The MWD can be infinitely varied between narrow and very wide by varying the amounts and the ratios of compounds (I) and (IV). The MWD has been found to increase with increasing amounts, in relative terms, of compound (I) (relative to (I)+(IV)) in the catalyst system.

The catalyst system also comprises a vanadium compound. Examples of suitable compounds are halides, oxyhalides, the alkoxides and the acetylacetonates such as vanadiumtetrachloride, vanadiumoxytrichloride and vanadiumacetylacetonate. Imidoaryl complexes of vanadium may also be applied. Such complexes are described in EP-A-532,098. Preferably, use is made of vanadium compounds that are soluble in the polymerization medium.

The presence of a promoter can increase the activity of the catalyst system. The promoter's presence also has an effect on the MWD. The more promoter is present, the narrower the MWD becomes. Preferably, the molar ratio of promoter:vanadium is <4. More particularly, the molar ratio of promoter vanadium is <2. Suitable promoters are halogenized compounds such as trichloroacetic acid or esters thereof, hexachloroacetone, hexachloropropylene, α-trichlorotoluene or perchlorocrotonic acid compounds. These compounds, however, have a high chlorine content. To prevent too high a halogen content from occurring in the rubbery copolymer to be prepared, use may be made of the specific low-halogen compounds suggested to be used as promoter in EP-A-44,119. Preferably, these compounds have at most 2 halogen atoms per molecule. Examples of such compounds include the alkyl or alkoxyalkylesters of phenyl, mono or dihalogen acetic acid.

The invention also relates to a process in which a catalyst system of the invention is employed in the preparation of a rubbery copolymer of ethylene, one or more α-olefins and optionally one or more polyunsaturated compounds in e.g. liquid-phase polymerization. Rubbery copolymer here and hereafter means a copolymer which at room temperature and higher temperatures exhibits at most 10% crystallinity measured by means of DSC (differential scanning calorimetry).

Suitable α-olefins which, besides ethylene, may be used as monomer are propylene, butene-1, pentene-1, hexene-1, octene-1 or the branched isomers thereof, such as 4-methyl-1-pentene as well as styrene, α-methylstyrene. Mixtures of these alkenes are also suitable; it is preferred for propylene and/or butene-1 to be used.

The polyunsaturated compound serves to provide polyunsaturation in the copolymer; it contains at least two C=C bonds and may be either aliphatic or alicyclic. Aliphatic polyunsaturated compounds generally contain from 3 to 20 carbon atoms with the double bonds being either conjugated or, preferably, unconjugated. Examples hereof are: 1,3-butadiene, isoprene, 2,3-dimethyl-1,3-butadiene, 2-ethyl-1,3-butadiene, piperylene, mycrene, allene, 1,2-butadiene, 1,4,9-decatriene, 1,4-hexadiene, 1,5-hexadiene and 4-methyl-1,4-hexadiene. Alicyclic polyunsaturated compounds, which may or may not contain a bridge group, may be mono or polycyclic. Examples of such compounds are norbornadiene and its alkyl derivatives; the alkylidenenorbornenes, in particular the 5-alkylidene-2-norbornenes in which the alkylidene group contains from 1 to 20, preferably from 1 to 8 carbon atoms; the alkenylnorbornenes, in particular the 5-alkenyl-2-norbornenes in which the alkenyl group contains from 2 to 20, preferably from 2 to 10 carbon atoms, for example vinylnorbornene, 5-(2'-methyl-2'butenyl)-2-norbornene and 5-(3'-methyl-2'butenyl)-2-norbornene; dicyclopentadiene and the polyunsaturated compounds of bicyclo-(2,2,1)-heptane, bicyclo-(2,2,2)-octane, bicyclo-(3,2,1)-octane and bicyclo-(3,2,2)-nonane, with at least one of the rings being unsaturated. Furthermore, use may be made of compounds such as 4,7,8,9-tetrahydroindene and isopropylidene tetrahydroindene. Especially suitable are dicyclopentadiene, vinylnorbornene, 5-methylene-2-norbornene or 5-ethylidene-2-norbornene or hexadiene-1,4. Mixtures of the aforementioned compounds may also be used.

The polyunsaturated compound may be present in the copolymer in amounts of up to 30 wt. %, preferably up to 15 wt. %.

If desired, besides or in place of the diene, an unsaturated compound having one or more functional groups such as halogen atoms, —OH, —OR, —COOH, —COOR or —NH$_2$ groups may be incorporated into the copolymer in an amount of up to 20 wt. %.

The molar ratio of the monomers applied is dependent on the desired composition of the polymer. It is not possible to quote any generally applicable ranges for the molar ratios since the polymerization rates of the monomers are far apart. For copolymerization of ethylene and propylene a molar ratio will generally be chosen between 1:1 and 1:50. If a polyunsaturated compound is to be copolymerized, its molar ratio relative to ethylene will usually be from 0.0001:1 to 1:1.

The polymerization reaction normally is conducted at a temperature of between −40 and 200° C., preferably between 10 and 80° C. The pressure normally is 0.1–5 MPa, but higher or lower pressures are also possible. Preferably, the process is carried out continuously, but it may also be carried out semi-continuously or batch-wise.

The residence time in the process may vary from some seconds to some hours. In general, the residence time will be chosen between some minutes and one hour. The MWD can also be controlled by varying the residence time in the reactor. The longer the residence time, the wider the MWD.

The polymerization may take place in a liquid that is inert to the catalyst system, e.g. one or more saturated aliphatic hydrocarbons such as butane, pentane, hexane, heptane, pentamethylheptane or petroleum fractions; aromatic hydrocarbons, e.g. benzene or toluene, or halogenated aliphatic or aromatic hydrocarbons, e.g. tetrachloroethylene. Operation may take place at such temperature and pressure that one or more of the applied monomers, particularly the α-olefin, e.g. propylene, are liquid and present in such large amounts that they act as distribution agent. In that case, no other distribution agent is needed. The process of the invention can be carried out in either a reactor filled with a gas and a liquid or in a reactor filled with a liquid. The use of a wholly or partially heterogenized catalyst system allows the polymerization process to be carried out in suspension or in the gas phase.

In addition to the possibilities already mentioned, the molecular weight can be adjusted by is means of techniques known to one skilled in the art. In particular, this can be effected using chain length controllers such as diethylzinc and, preferably, hydrogen. Minute amounts of hydrogen have a sufficient effect on the molecular weight.

Surprisingly, it has been found that the catalyst system described above is particularly suited for application in liquid-phase processes at room temperature or even higher temperatures so that, in contrast with the conventional liquid-phase processes, the heat of reaction can be carried off in a more efficient manner. As is known, this can be effected by strongly cooling the feed to the reactors as well as by evaporating a portion of the reaction medium. Following the polymerization, the polymer can be worked up in various ways. For liquid-phase processes this may be by evaporating the solvent or by steam-coagulation.

In general, the copolymers that are obtainable with the process of the invention contain between 25 and 85 wt. % ethylene. However, products having an ethylene content of between 40 and 75 wt. % are preferred.

The overriding advantage of the use of a catalyst system of the invention is that rubbers having a very wide MWD, of more than 5 and even >20 can be obtained (in a single reactor). In addition, it has been found that the MWD can be infinitely varied if compound (IV) and/or the promoter is/are also present. Any MWD can be obtained in this way.

Such copolymers are suited for sundry applications, e.g. for the manufacture of hoses, cables, conveyor belts, sealing sections. They may optionally be vulcanized using customary techniques with the aid of materials that supply free radicals such as peroxides or with the aid of sulphur. These copolymers lend themselves very well to processing. Customary techniques of rendering a rubber processable can also be applied to these copolymers. For example, the copolymer can be extended with oil; this is preferably done after the polymerization. Agents may also be added for making friable bales. This can be accomplished by, for example, adding talcum or by using a system such as the one described in EP-A-427,339. The composition set forth therein, comprising an inorganic partitioning agent, a thickener and binder reagent and an anionic dispersant, has been found to be very well suitable for use in the products of the invention.

The invention will now be described with reference to the following examples and comparative experiments, without being limited thereto.

The compositions of the copolymers were determined by means of Fourier transformation infrared spectroscopy (FT-IR) using the technique commonly used in the rubber industry. The FT-IR measurement gives the copolymer's composition expressed in percentages by weight of monomer units. In the examples, the copolymer's composition, determined by FT-IR, is expressed in percentages by weight of propylene units (% $C_3$).

The molecular weight was determined by size exclusion chromatography-differential viscosimetry (SEC-DV). SEC-DV was used for determining the number-average molecular weight ($M_n$), the weight-average molecular weight ($M_w$), the z-average molecular weight ($M_z$) and the molecular weight distribution (MWD=$M_w/M_n$).

The crystallization behaviour of the copolymers obtained was determined by differential scanning calorimetry (DSC). On rapid heating to 200° C. and holding at that temperature for 5 minutes, the specimen is cooled to −70° C. at the rate of 10° C./minute. The concomitant thermal effects, such as the crystallization point ($T_c$, in °C.) and the crystallization enthalpy (ΔH, in kJ/kg) of the copolymer, are recorded.

The polymer yield in the examples is expressed in g of copolymer per mmole of vanadium.

EXAMPLES

Example I

Preparation of various metal-imido complexes

General method of preparation

An x equivalent of a primary amine was added at room temperature to a solution of triethylaluminium (TEA) in pentamethylheptane. The reaction mixture was heated to 170° C. for 3 hours, in which process 2x equivalents of gaseous ethane were released. The reaction mixture was cooled to room temperature and diluted with heptane. The organoaluminium-imido complex was mixed with ethylaluminiumdichloride (x equivalent relative to TEA) so as to obtain an imido cocatalyst.

TABLE 1

| amine | κ equivalent amine | imido cocatalyst |
|---|---|---|
| aniline | 0.5 | 1 |
|  | 1 | 2 |
| methoxyethylamine | 0.5 | 3 |
|  | 1 | 4 |
| furfurylamine | 0.5 | 5 |
|  | 1 | 6 |

Example II

Batch-polymerization processes

A 1.5-liter autoclave was filled with 300 ml of heptane and metal-imido complex (0.5 mmole). A pressure of 0.7 MPa was established in the reactor by means of purified monomers and the reactor was so conditioned that the ratio of propylene:ethylene in the gas hood was 2:1. The reactor temperature was approx. 30° C. Once the reactor had been conditioned, the vanadium compound (0.05 mmole) and optional promoter (0.05 mmole) were pumped into the reactor. During the polymerization, the monomer concentrations were kept as constant as possible by adding propylene (200 Nl/hour) and ethylene (100 Nl/hour) to the reactor. Approx. 2 Nl/hour of hydrogen was added in all examples. After a polymerization time of 15 minutes the reactor was relieved of pressure and the solution was collected and dried. A rubbery copolymer of ethylene and propylene was obtained.

Use of various organometal-imido complexes

Various alkylaluminium-imido chlorides (as obtained in Example I) were employed as cocatalysts in batch-polymerizations. The cocatalysts differed with respect to the overall composition or the composition of the imido group. Vanadyltrichloride ($VOCl_3$) was used as vanadium compound. The results are given in Table 2 below.

TABLE 2

| Example/ Comp. exp. | cocatalyst No. | yield g/mmole | % C3 wt. % | $M_n$ kg/mole | $M_w$ kg/mole | $M_z$ kg/mole | MWD | $T_c$ ° C. | ΔH kJ/kg |
|---|---|---|---|---|---|---|---|---|---|
| A | SEAC | 180 | 42 | 230 | 430 | 710 | 1.9 | −8 | 0.3 |
| II.1 | 1 | 310 | 43 | 12 | 480 | 2200 | 40 | 4 | 10 |
| II.2 | 2 | 160 | 39 | 10 | 1670 | 7000 | 167 | −6 | 27 |
| II.3 | 3 | 304 | 41 | 25 | 500 | 2400 | 20 | 7 | 13 |
| II.4 | 4 | 102 | 32 | 16 | 840 | 3700 | 51 | 25 | 44 |
| II.5 | 5 | 348 | 42 | 22 | 550 | 3800 | 25 | 4 | 14 |
| II.6 | 6 | 356 | 43 | 15 | 540 | 3300 | 36 | −4 | 9 |

This set of examples clearly shows that the molecular weight distribution can be widened by means of various imido cocatalysts.

The activity of the overall catalyst system can be optimized by suitable selection of the cocatalyst composition.

Example III

Use of various transition metal compounds

Batch-wise polymerizations were carried out analogously to Example II.

In these examples the effect was studied of using different V compounds in the catalyst system.

Cocatalyst 5 was used as cocatalyst. The results are given in Table 3.

The following V compounds were used:
1=vanadyltrichloride [$VOCl_3$]
2=vanadyldichloroisopropylate [$VOCl_2(O^iPr)$]
3=o,o-dimethylphenylimidovanadiumtrichloride [$DMFIVCl_3$]
4=vanadiumtetrachloride [$VCl_4$]

Example IV

Use of promoter as catalyst component

Tests were conducted analogously to Example III. In Example IV.2, 1 mmole of cocatalyst 5 was added and 0.05 mmole of dichlorophenylacetic ethyl ester (DCPAE) was premixed with vanadium compound 2. The results are given in Table 4. This shows that use of a promoter in the catalyst system of the invention results in a narrowing of the MWD.

TABLE 4

| Example | V-Compound | Yield g/mmole | % C3 wt. % | $M_n$ kg/mole | $M_w$ kg/mole | $M_z$ kg/mole | MWD | $T_c$ ° C. | ΔH kJ/kg |
|---|---|---|---|---|---|---|---|---|---|
| IV.1 | 2 | 360 | 43 | 15 | 330 | 1250 | 22 | 8 | 12 |
| IV.2 | 2 + DCPAE | 262 | 31 | 15 | 195 | 770 | 13 | 9 | 35 |

What is claimed is:

1. Process for the preparation of a rubbery copolymer, wherein ethylene, one or more α-olefins, and optionally one or more polyunsaturated compounds are contacted under polymerization conditions with a catalyst system comprising a soluble vanadium compound and an organometal compound, wherein the organometal complex in the catalyst system comprises an aluminum complex that satisfies the general formula:

TABLE 3

| Example | V-Compound | Yield g/mmole | % C3 wt. % | $M_n$ kg/mole | $M_w$ kg/mole | $M_z$ kg/mole | MWD | $T_c$ ° C. | ΔH kJ/kg |
|---|---|---|---|---|---|---|---|---|---|
| III.1 | 1 | 348 | 42 | 22 | 550 | 3800 | 25 | 4 | 14 |
| III.2 | 2 | 360 | 43 | 15 | 330 | 1250 | 22 | 8 | 12 |
| III.3 | 3* | 98 | 36 | 31 | 170 | 410 | 5.5 | 20 | 20 |
| III.4 | 4 | 284 | 53 | 43 | 240 | 1250 | 5.5 | 11 | 4 |

3*: The vanadium compound and the cocatalyst were premixed.

These examples show that the vanadium compound can be freely chosen: all compounds tested give active to highly active catalyst systems, yielding copolymers having a wide molecular weight distribution.

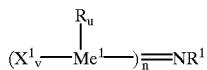 (I)

wherein each individual Me¹ comprises aluminum, each individual $R_u$ comprises hydrogen or a hydrocarbon group having 1–20 C atoms, N—R¹ comprises a group where R¹ comprises hydrogen, a hydrocarbon group having 1–20 C atoms or a group with the general formula $MR^3{}_3$, wherein M comprises an element chosen from group 14 of the Periodic System of Elements, each individual R³ comprises hydrogen, a hydrocarbon group having 1–20 C atoms or a heteroatom containing group, X¹ comprises a halogen atom, and n=2, u>0,v>1, and u+v+2/n=p=3, wherein p=valency of Me¹.

2. A process according to claim 1, wherein Me¹ comprises aluminum and X¹ comprises chlorine.

3. A process according to claim 1, further comprising a promoter whereby the molar ratio of promoter:vanadium is less than 4.

4. A process according to claim 3, wherein the molar ratio of promoter:vanadium is less than 2.

* * * * *